(12) United States Patent
Saito

(10) Patent No.: US 6,975,436 B2
(45) Date of Patent: Dec. 13, 2005

(54) IMAGE READING APPARATUS

(75) Inventor: Naho Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 842 days.

(21) Appl. No.: 09/910,508

(22) Filed: Jul. 19, 2001

(65) Prior Publication Data

US 2002/0054361 A1 May 9, 2002

(30) Foreign Application Priority Data

Jul. 19, 2000 (JP) ........................................ 2000-218909

(51) Int. Cl.$^7$ .............................................. H04N 1/04
(52) U.S. Cl. ...................................... 358/497; 358/483
(58) Field of Search ................................ 358/497, 483, 358/474, 494, 471, 442, 482, 505, 512–514, 487, 506, 472, 473; 382/312, 313, 318, 319; 250/208.1, 234–236; 359/209, 210, 212; 399/211, 212

(56) References Cited

U.S. PATENT DOCUMENTS 6,002,508 A * 12/1999 Mai ............................ 359/212
6,196,855 B1 * 3/2001 Huang ........................ 439/162
6,246,492 B1 * 6/2001 Chang et al. ................ 358/497
6,330,084 B1 * 12/2001 Chiang ........................ 358/497
6,335,802 B1 * 1/2002 Hung-Che et al. .......... 358/296
6,373,601 B1 * 4/2002 Cheng ......................... 358/474
6,552,272 B1 * 4/2003 Sheng et al. ........... 174/117 FF
6,575,600 B2 * 6/2003 Huang et al. ................ 362/297
6,626,360 B2 * 9/2003 Huang ......................... 235/454
6,631,014 B1 * 10/2003 Aoshima et al. ............ 358/497
6,667,469 B2 * 12/2003 Tregoning ................ 250/208.1
6,717,702 B1 * 4/2004 Yamauchi et al. ........... 358/497
6,765,702 B2 * 7/2004 Tang et al. .................. 358/497

FOREIGN PATENT DOCUMENTS

JP          2003233138 A  *  8/2003   ........... G03B/27/50

* cited by examiner

Primary Examiner—Cheukfan Lee
(74) Attorney, Agent, or Firm—Morgan & Finnegan, LLP

(57) ABSTRACT

A flat cable 121 is plugged in a connector 125 on a USB connector board 123 at one end, and plugged in a connector 128 on a mainboard 122 at the other end, and put approximately one round, thereby the flat cable 121 is provided with wider surfaces along a vertical direction to the surface of glass plate 105 in the apparatus. The flat cable 121 is passed by a reading unit 110, avoiding a position under the reading unit 110, along a side wall as a part of a frame 101 around the glass plate 105.

16 Claims, 5 Drawing Sheets

IMAGE READING APPARATUS

FIELD OF THE INVENTION

The present invention relates to an image reading apparatus for reading an image of an original on a glass plate by scanning e.g. a reading unit.

BACKGROUND OF THE INVENTION

Conventionally, as an image reading apparatus of this type, an apparatus as shown in FIG. 4 is known. In FIG. 4, an original P is placed on a glass plate 105 as a light transmitting member, then a cover 1 is closed to press the original P against the glass plate 105.

Reference numeral 101 denotes a frame which also serves as an external cover, including constituent elements such as a guide bar 102, a reading unit 110 as image reading means and a holder 107.

The reading unit 110 reads an image of the original P, while the unit, guided by a guide shaft 102, is scanned in parallel to the glass plate 105 by driving rotation of motor 106.

The reading unit 110 includes an LED of three colors (R, G and B) as a light source for irradiating the original, a rod lens array which forms an image from light reflected from the original on a photoreception device of image sensor, and the image sensor. The light source of the three-color LED is sequentially changed and turned on, and the image sensor reads light reflected from the original by each color, thus performs color separation reading.

The reading unit 110 is provided on the holder 107 and thrusted against the glass plate 105. The holder 107 and the reading unit 110 construct the image reading means for performing a scan movement.

A slider 112 is provided on the holder 107. The holder 107 is slidably supported on the guide shaft 102 by the slider 112.

The guide shaft 102 is supported by bearings of the frame 101 at ends and fixed to the frame 101 with screws, thus unrotatably positioned.

The motor 106 as a driving source to move the reading unit 110 along the guide shaft 102 is provided in a lower position of the frame 101.

The frame 101 includes a transmission mechanism to transmit the driving force from the motor 106 to the holder 107 and the reading unit 110. The transmission mechanism has a driving wire 104 and a pulley 103.

The driving wire 104 is fixed to the frame 101 at one end, and supported by deflection means (not shown) at the other end, thus the wire has a predetermined tension. Further, the holder 107 is fixed to the driving wire 104, and the holder 107 is movable along the movement of the driving wire 104.

The driving wire 104 is put around the pulley 103, and the driving force from the motor 106 is transmitted to the pulley 103.

Then, as the driving force from the motor 106 is transmitted to the pulley 103, then the driving force is further transmitted to the driving wire 104 around the puller 103, and the holder 107 and the reading unit 110 move. The reading unit 110 reciprocate-moves in parallel to the glass plate 105 by forward/reverse movement of the driving wire 104 in correspondence with forward/reverse rotation of the motor 106 and the pulley 103.

Further, a mainboard 108 is provided in a low position of the frame 101. A flat cable 111 as a control signal path for the reading unit 110 is connected to the mainboard 108, and a flat cable 113 as a control signal path for the motor 106 and the pulley 103 as drive means is connected to the mainboard 108.

However, in the above-described conventional art, the mainboard 108 is fixed to the frame 101, and the flat cable 111 as a control signal path for the reading unit 110 is connected to the mainboard 108.

Since a large number of signal lines are used in the control signal path of the reading unit 110, the width of wider surfaces of the flat cable 111 is very large. For this reason, the wider surfaces of the flat cable 111 must be parallel to the surface of the glass plate 105 as shown in FIG. 4.

In this arrangement, in a case where the apparatus is of thin type, the glass plate 105 and the flat cable 111 come into contact with each other. Upon movement of the reading unit 110 in, e.g., an arrow B direction in FIG. 5A, the flat cable 111 is moved in a direction opposing friction with the glass plate 105, the flat cable 111 tends to buckle as shown in FIG. 5B.

Further, in the conventional art, as the width of the wider surfaces of the flat cable 111 is large and the cable is provided in parallel to the surface of the glass plate 105, it is difficult to hide the flat cable 111 under a frame portion of the frame around the glass plate 105. The flat cable 111 in the frame 101 is seen and the appearance is poor.

SUMMARY OF THE INVENTION

The present invention has been made to solve the problem of the above-described conventional art, and has its object to provide an image reading apparatus having a simplified structure, where buckling of cable provided in the apparatus is prevented, and the cable is hidden for improvement in the appearance of the apparatus.

According to the present invention, the foregoing object is attained by providing an image reading apparatus comprising: a light transmitting member on which an original is placed; image reading means, scanned along said light transmitting member, for reading an image of the original via said light transmitting member; a control board, connected to said image reading means, which controls reading scanning of said image reading means; and an interface connector, connected to an external device, which transmits an output signal from said control board to the external device, wherein said control board is integral with said image reading means, and said control board is connected with said interface connector by a flexible interface cable which transmits a signal of the interface.

In the present invention as described above, in comparison with the case where a cable connects the image reading means to the control board for controlling the reading scanning, the interface cable has a smaller number of signal lines. Accordingly, the width of the cable can be reduced, and the arrangement of the cable in the apparatus can be simplified.

Further, it is preferable that said light transmitting member is surrounded by a frame, and said flexible interface cable is provided around said light transmitting member.

In this arrangement, as the thin interface cable having a reduced number of signal lines is provided along an inside wall of the frame, the structure of the apparatus can be simplified.

Further, it is preferable that said interface connector is provided on the side of end position of said image reading means, and wherein when said image reading means is in a home position, said flexible interface cable is hidden under said frame around said light transmitting member.

In this arrangement, as the cable is hidden when the image reading position is in the home position, the appearance of the apparatus is improved.

Further, it is preferable that said flexible interface cable is a flat cable, and a wider surface of said flat cable is provided along a vertical direction to a surface of said light transmitting member.

In this arrangement, in comparison with the case where the cable connects the image reading means to the control board to control the reading scanning, the interface cable has a smaller number of signal lines. Accordingly, the width of the wider surfaces of the flat cable can be reduced, and the arrangement of the cable in the apparatus can be simplified. Further, the apparatus is still thin even in a case where the flat cable is set with the wider surfaces along a direction vertical to the surface of the light transmitting member. Further, as the wider surface of the flat cable does not come into contact with the light transmitting member, the buckling can be prevented without friction from the light transmitting member when the image reading means moves. Further, when the wider surfaces of the flat cable are set along the direction vertical to the surface of the light transmitting member and hidden under the frame portion around the light transmitting member, the appearance is improved.

Further, it is preferable that the image reading apparatus further comprises drive means for driving said image reading means, and said drive means is integral with said image reading means.

In this arrangement, the drive means moves with scanning of the image reading means. As a cable connecting the image reading means to the drive means can be omitted, the appearance is improved and the structure is simplified.

Further, it is preferable that an operation switch which operates said image reading means is integral with said image reading means.

In this arrangement, the operation switch moves with the scanning of the image reading means. As a board for the operation switch can be omitted, the appearance is improved and the structure is simplified, thus cost reduction is attained.

Further, it is preferable that said interface is a USB interface.

In the USB interface, as the number of pins indicating the number of signal lines is small, the width of the interface cable provided in the apparatus can be reduced.

Further, it is preferable that said interface is an IEEE1394 interface.

In the IEEE1394 interface, as the number of pins indicating the number of signal lines is small, the width of the interface cable provided in the apparatus can be reduced.

Further, according to the present invention, the foregoing object is attained by providing an image reading apparatus comprising: a light transmitting member on which an original is placed; image reading means, scanned along said light transmitting member, for reading an image of the original via said light transmitting member; a control board, connected to said image reading means, which controls reading scanning of said image reading means; and an interface which transmits an output signal from said control board to an external device, wherein said control board is integral with said image reading means, and wherein the output signal from said control board is a signal of said interface.

Further, it is preferable that said interface is a wireless communication interface.

In wireless communication, as a signal line is not used, the cable provided in the apparatus can be further thinned. Further, as a portion where a high frequency signal is used is limited, the emission of unnecessary radio waves can be easily prevented. In the image reading apparatus which uses wireless communication in the interface, it is preferable that a battery is used as a power supply since a cable is unnecessary upon image reading and the operativity is improved. Further, in the image reading apparatus which uses a battery as the power supply, it is preferable that the battery is integral with the reading unit and the battery is also scanned. As a connection cable between the moving portion and the frame can be omitted, the cable is not buckled, and further, the appearance is improved.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings. Note that sizes, materials, shapes of constituent elements and relative arrangement thereof, unless particularly described, do not pose any limitation on the scope of the invention.

Figure 1:
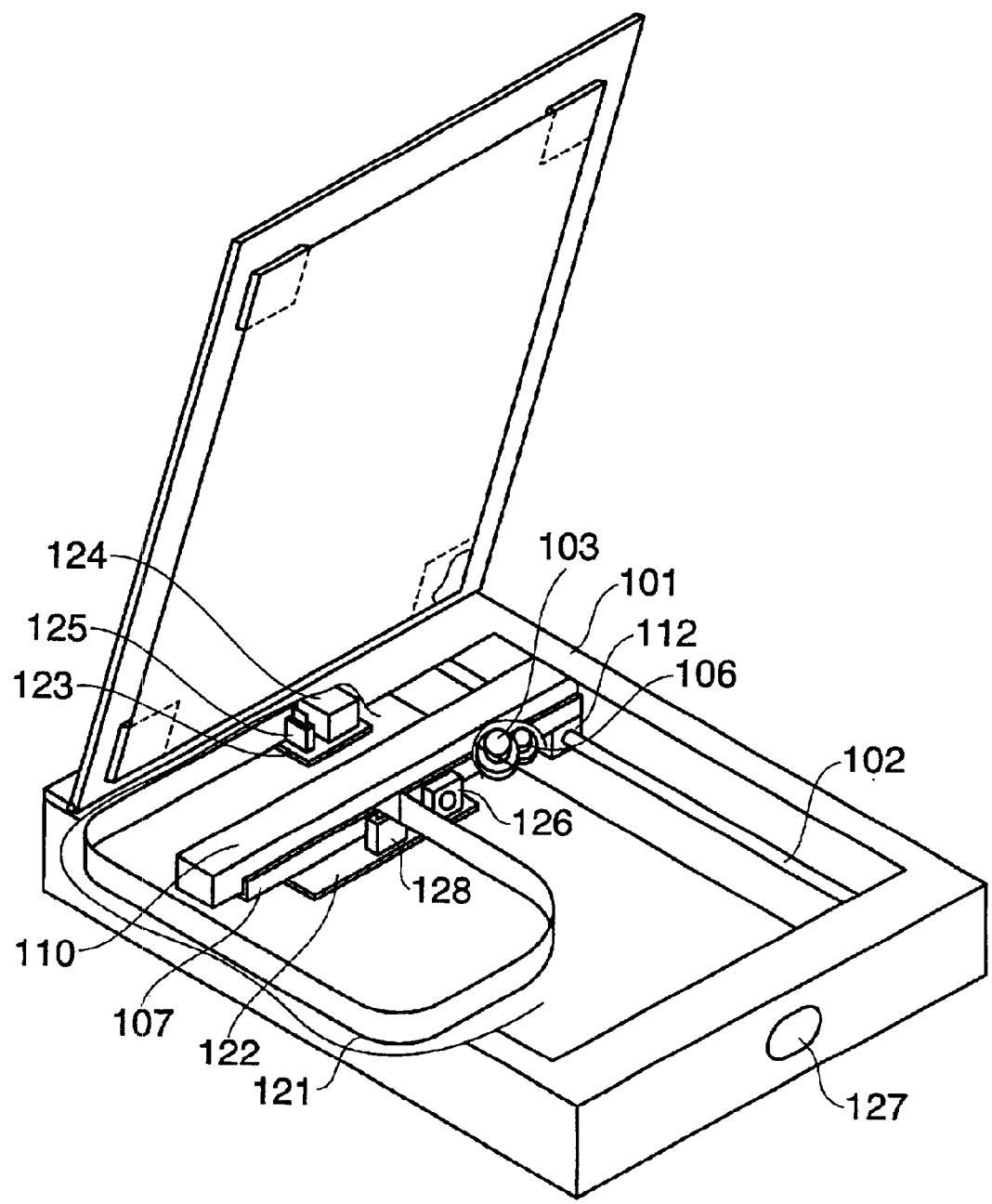
FIG. 1 is a perspective view showing the structure of an image reading apparatus according to an embodiment of the present invention.
Figure 2:
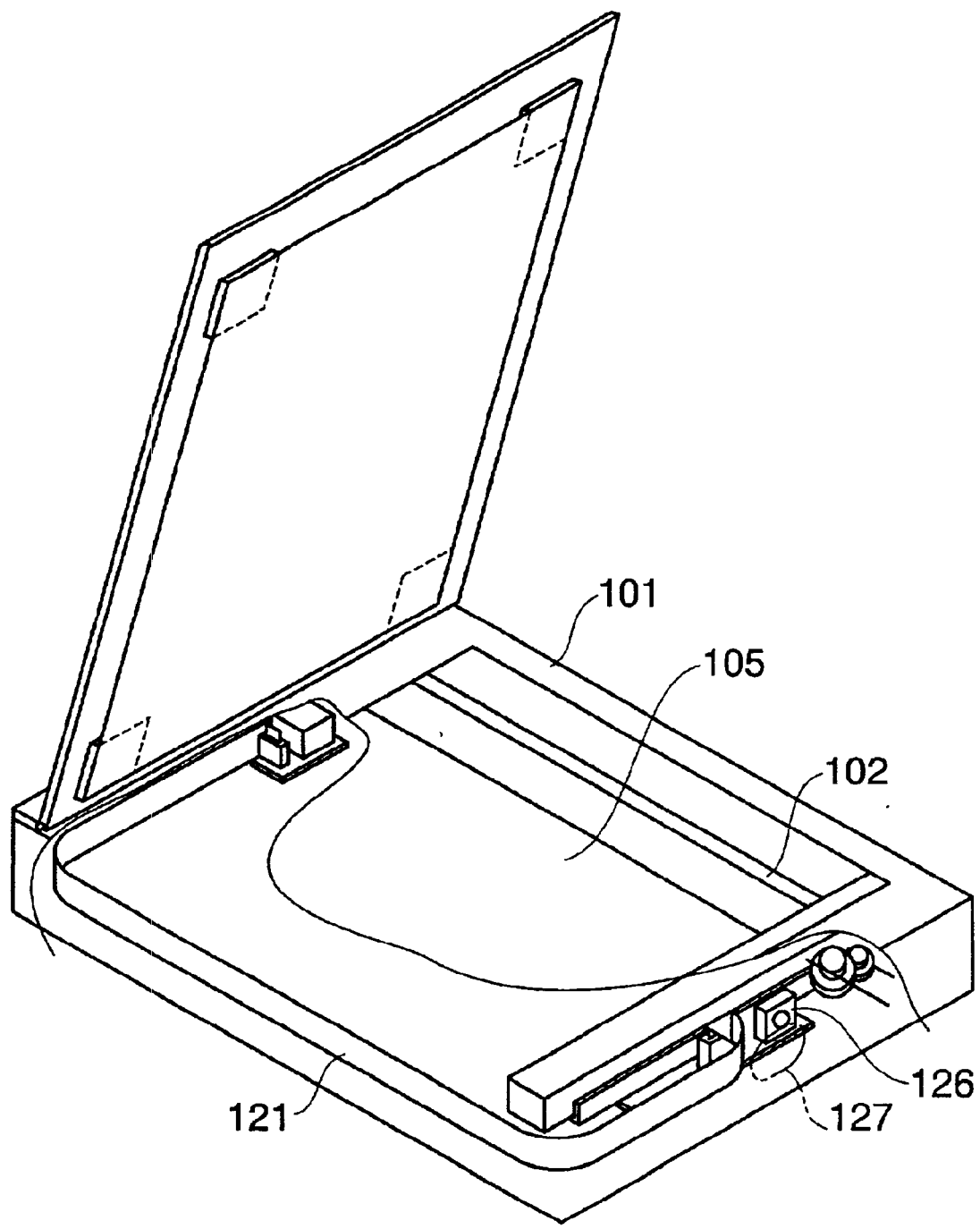
FIG. 2 is a perspective view showing the image reading apparatus when image reading means moves to a home position.

The embodiment of the present invention will be described with reference to FIGS. 1 to 3. FIG. 1 is a perspective view showing the structure of image reading apparatus of the present embodiment.

Numeral 101 denotes a frame, having a glass plate 105 in an upper position, which serves as an external cover of the apparatus.

Numeral 102 denotes a guide shaft fixed to the frame 101 at both ends. The guide shaft 102 is supported by bearings of the frame 101 at one end and fixed to the frame 101 with screws, thus unrotatably positioned. A holder 107 is slidably supported by the guide shaft 102.

A slider 112 is provided on the holder 107. The holder 107 is slidably supported on the guide shaft 102 by the slider 112.

Numeral 110 denotes a reading unit. The reading unit 110 is provided on the holder 107 and thrusted against the glass plate 105. The holder 107 and the reading unit 110 construct image reading means for performing scan movement.

The reading unit 110 includes an LED of three colors (R, G and B) as a light source for irradiating an original, a rod lens array which forms an image from light reflected from the original on a photoreception device of image sensor, and the image sensor. The light source of the three-color LED is sequentially changed and turned on, and the image sensor reads light reflected from the original by each color, thus performs color separation reading.

Numeral 106 denotes a motor fixed to the holder 107. The motor 106 moves with the scanning of the reading unit 110.

Numeral 103 denotes a pulley fixed to the holder 107. The pulley 103 rotates in synchronization with a driving wire 104, to scan the reading unit 110.

The driving wire 104 is fixed to the frame 101 at one end, and supported by deflection means (not shown) at the other end, thus maintaining a predetermined tension. Further, the holder 107 is fixed to the driving wire 104, and the holder 107 is movable with the movement of the driving wire 104.

Numeral 122 denotes a mainboard as a control board to control the reading scanning. The mainboard 122 is fixed to the holder 107, and moves with the scanning of the reading unit 110.

Numeral 126 denotes a tact switch as an operation switch provided on the mainboard 122. That is, the tact switch 126 is integral with the image reading means (the reading unit 110 and the holder 107). Further, the mainboard 122 is provided with a connector 128 connected to a flat cable 121.

Numeral 123 denotes a USB connector board fixed to the frame 101 and positioned on the side of the end position of the reading unit 110. The board 123 is provided with a USB connector 124 as an interface connector for connection with a USB cable from the outside the apparatus. Further, the board 123 is provided with a connector 125 to transmit a signal of the USB connector to the flat cable 121.

The flat cable 121 is plugged in the connector 125 on the USB connector board 123 at one end and plugged in the connector 128 on the mainboard 122 at the other end, and put approximately one round, thereby the flat cable 121 is provided with wider surfaces along a vertical direction to the glass plate 105 in the apparatus. The flat cable 121 is passed by the reading unit 110, avoiding a position under the reading unit 110, along a side wall as a part of the frame 101 around the glass plate 105.

As the flat cable 121 is an interface cable with a reduced number of signal lines, in comparison with the case where a cable connects the reading unit 110 to the mainboard to control the reading scanning, the width of the flat cable 121 provided in the apparatus can be reduced, and the arrangement of the flat cable 121 in the apparatus can be simplified.

Accordingly, even if the flat cable 121 is provided with the wider surfaces along the vertical direction to the glass plate 105, the apparatus can be constructed as a thin type apparatus, and further, the flat cable 121 does not come into contact with the glass plate 105.

Note that as the USB used in the present embodiment is an interface where the number of pins indicating the number of signal lines is small, the width of the flat cable 121 provided in the apparatus can be reduced.

Further, numeral 127 denotes a button supported by the frame 101. When the reading unit 110 is in a home position, the tact switch 126 can be operated from the outside by using the button 127. That is, when the button 127 is depressed in the state as shown in FIG. 2, the tact switch 126 is turned ON, and the reading is started.

In the image reading apparatus as described above, the reading unit 110 reads the image of the original P when the unit, guided by the guide shaft 102, is scanned in parallel to the glass plate 105 by driving rotation of the motor 106.

Accordingly, in the present embodiment, as the flat cable 121 is not in contact with the glass plate 105 when the reading unit 110 reciprocate-moves, the flat cable 121 can be prevented from being moved in a direction opposing friction with the glass plate 105 and being buckled.

Further, as the flat cable 121 is provided along the periphery of the glass plate 105 and the connector 125 is provided on the side of the end position of the reading unit 110, the flat cable 121 is hidden under the frame 101 when the reading unit 110 is in the home position.

Figure 3:
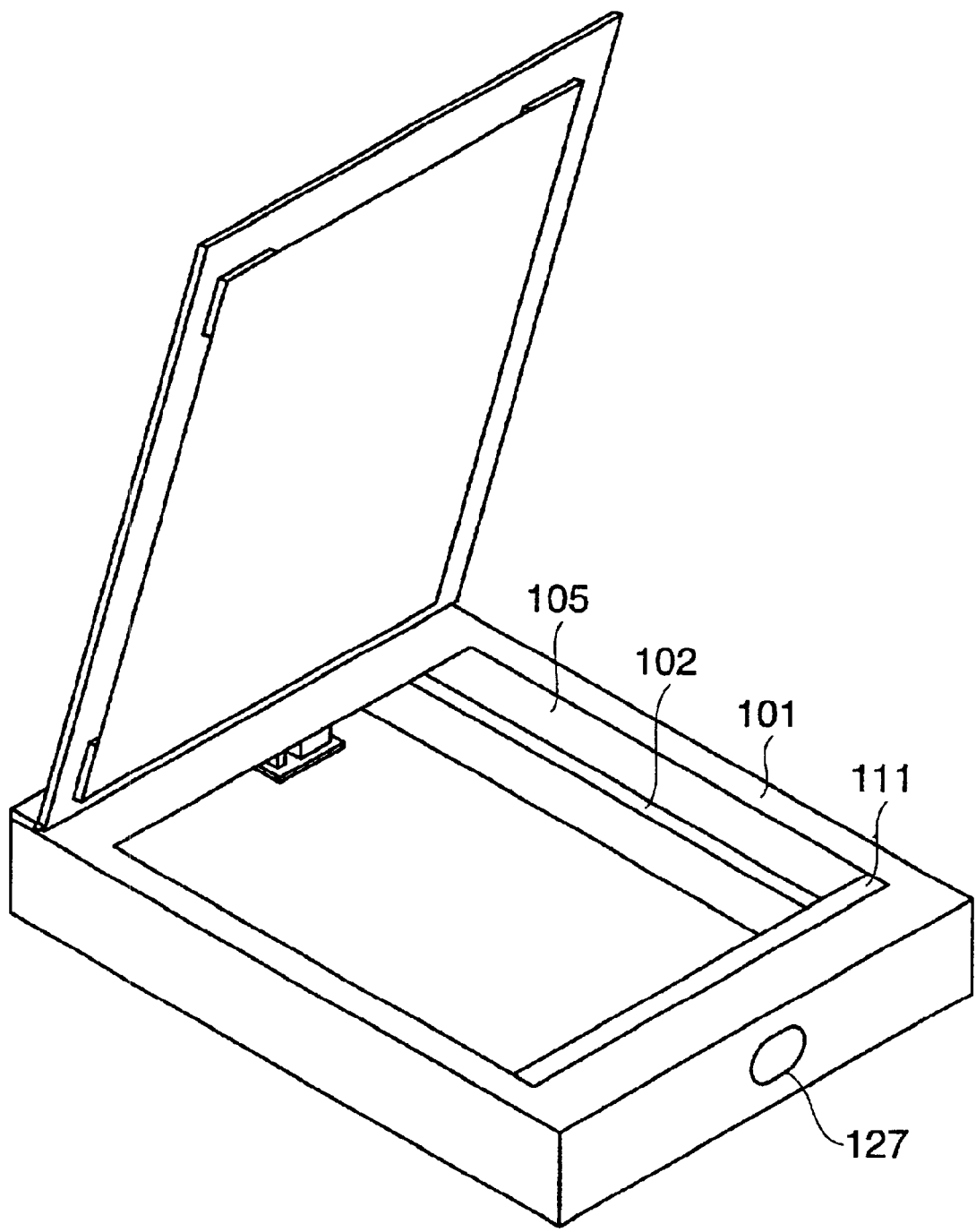
FIG. 3 is a perspective view showing the outer appearance of the image reading apparatus.
Figure 4:
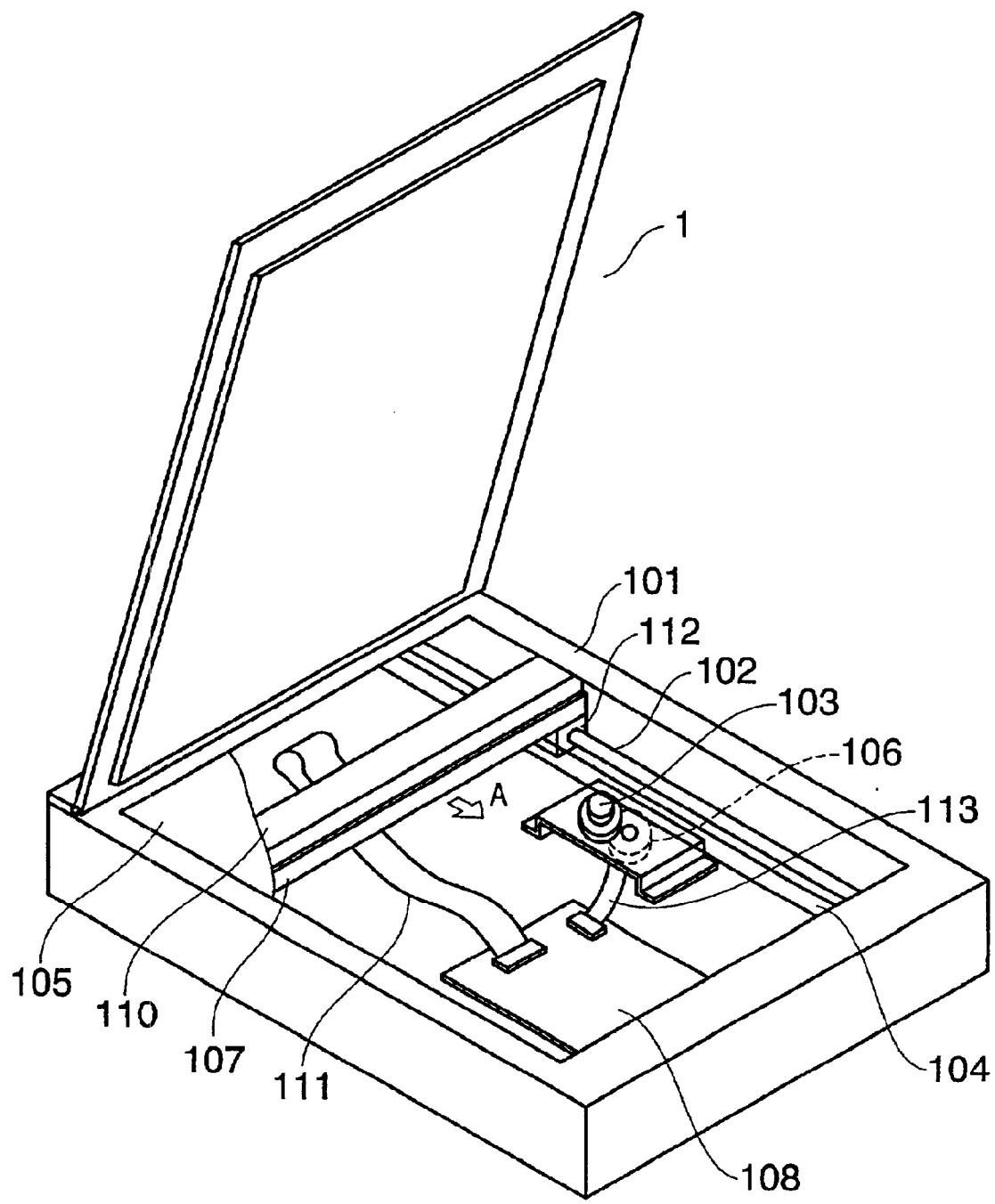
FIG. 4 is a perspective view showing the structure of the image reading apparatus according to the conventional art.
Figure 5A:
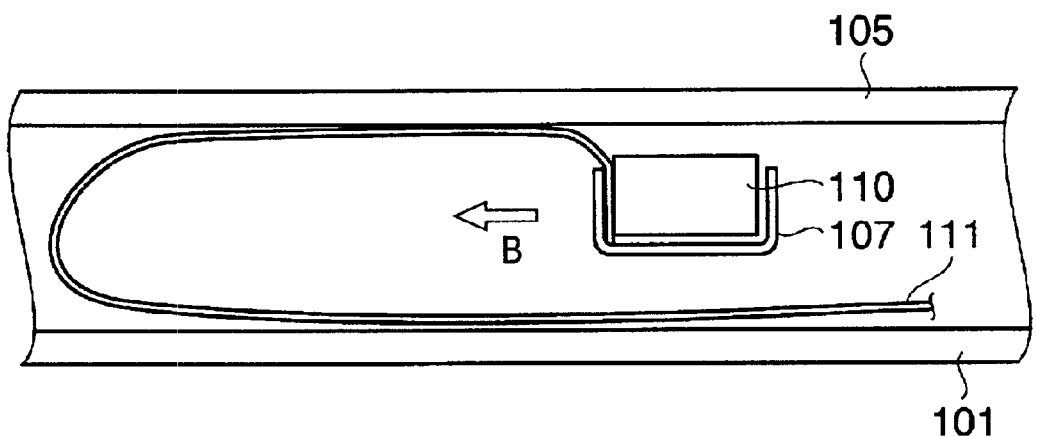
FIGS. 5A and 5B are explanatory views of the buckling of the flat cable in the image apparatus according to the conventional art.
Figure 5B:
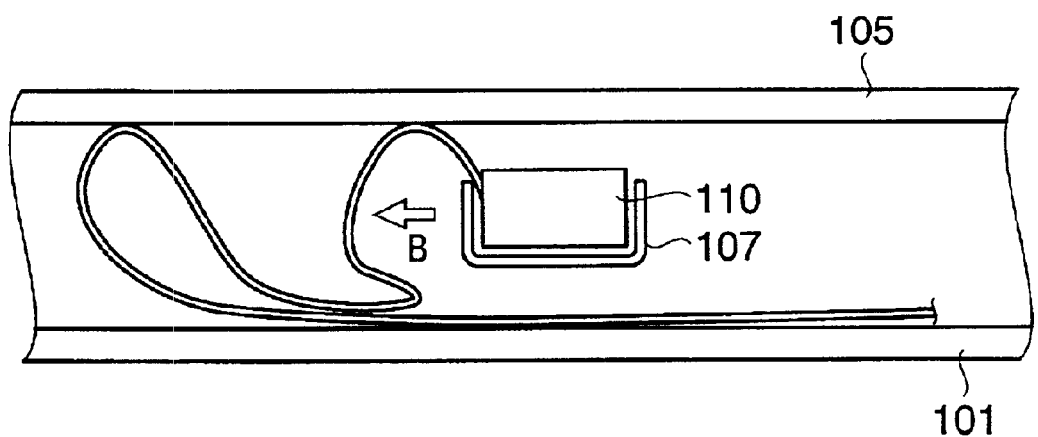

Accordingly, as shown in FIG. 3, when the reading unit 110 is in the home position, the flat cable 121 is not seen. Thus the appearance of the apparatus is improved.

Further, the motor 106 and the pulley 103 are integral with the reading unit 110 and they move with the scanning. Accordingly, a cable to connect the reading unit 110 to the motor 106 can be omitted from the apparatus. As shown in FIG. 3, the motor 106 and the pulley 103 are also not seen in the frame 101 from the glass plate 105. Thus the appearance of the apparatus is improved and the structure is simplified.

Further, the tact switch 126 is integral with the reading unit 110, and the switch moves with the scanning. Accordingly, the mainboard 122 also serves as a board where the tact switch 126 is provided, i.e., the board for the tact switch 126 is omitted. Thus the appearance of the apparatus is improved and the structure is simplified.

Note that as the USB cable provided in the apparatus, a bundle of lines may be used in place of the flat cable 121.

Further, the interface is not limited to the USB interface, but any interface with a small number of pins, such as the IEEE 1394 interface, is used in the same cable arrangement.

Further, in the case where the number of pins is large, the same arrangement can be made by using plural flat cables.

According to the above embodiment, as the image reading means which scans under the glass plate is integral with the control board, only the interface cable is provided in the apparatus. Thus the structure of the apparatus is simplified.

In use of flat cable as the interface cable provided in the apparatus, as the number of signal lines is small and the width of the wider surfaces of the flat cable is small, the flat cable can be provided with the wider surfaces along a vertical direction to the surface of the light transmitting member.

In this arrangement, when the image reading means moves, as the flat cable does not come into contact with the light transmitting member and does not receive a friction force from the light transmitting member, the cable can be prevented from being buckled.

Further, as the interface cable is put in corners of the frame around the light transmitting member, the interface cable is not seen, and the appearance is improved.

Further, as the operation switch is integral with the image reading means, a board for the operation switch can be omitted, thus the costs can be reduced.

Further, as the interface, a wireless communication interface for Bluetooth, a wireless LAN (IEEE 802.11 standard) or the like can be used. In this case, it is arranged such that only electric power is supplied from the connector 128 on the mainboard 122 as the control board, a transmission/reception circuit of the wireless communication interface is provided on the mainboard 122, and an antenna is integral with the mainboard 122 and the reading unit 110 and is also scan-moved. Further, the frame 101 is formed with an electrically conductive synthetic resin material. Further, the cable 121 is connected only with a power supply provided in the image reading apparatus. Thus a thinner cable with a further reduced number of pins can be used, and the appearance is improved. To utilize the characteristic of wireless communication interface, it is preferable to use a battery as a power supply to drive the image reading apparatus, and to connect the apparatus to a commercial power supply to perform an image reading operation and charging, in accordance with necessity. As a high frequency signal to control the image reading apparatus is used only in a scan-moving portion, a countermeasure against emission of unnecessary radio waves can be easily made. Further, if it is arranged such that the battery is also integral with the mainboard 122 and the reading unit 110 and the battery is also scan-moved, the cable can be omitted. There is no possibility of buckling, and the appearance is improved.

The present invention is not limited to the above embodiments and various changes and modifications can be made within the spirit and scope of the present invention. Therefore, to appraise the public of the scope of the present invention, the following claims are made.

What is claimed is:

1. An image reading apparatus comprising:
   a light transmitting member on which an original is placed;
   image reading means, scanned along said light transmitting member, for reading an image of the original via said light transmitting member;
   a control board, connected to said image reading means, which controls reading scanning of said image reading means; and
   an interface connector, connected to an external device,
   wherein said control board is moved together with said image reading means, and said control board is connected with said interface connector by a flexible interface cable which transmits a signal of the interface.

2. An image reading apparatus comprising:
   a light transmitting member on which an original is placed;
   image reading means, scanned along said light transmitting member, for reading an image of the original via said light transmitting member;
   a control board, connected to said image reading means, which controls reading scanning of said image reading means; and
   an interface which transmits an output signal from said control board to an external device,
   wherein said control board is moved together with said image reading means.

3. An image reading apparatus comprising:
   a light transmitting member on which an original is placed;
   an image reading unit, scanned along said light transmitting member, and adapted to read an image of the original via said light transmitting member;
   a control board, connected to said image reading unit, which controls reading of said image reading unit; and
   an interface connector, connected to an external device, which transmits an output signal from said control board to the external device,
   wherein said control board is moved together with said image reading unit, and said control board is connected with said interface connector by a flexible interface cable which transmits a signal of the interface.

4. The image reading apparatus according to claim 3, wherein said light transmitting member is surrounded by a frame, and said flexible interface cable is provided along an inside wall of the frame.

5. The image reading apparatus according to claim 4, wherein said interface connector is provided on the side of end position of said image reading unit, and wherein when said image reading unit is in a home position, said flexible interface cable is hidden under said frame around said light transmitting member.

6. The image reading apparatus according to claim 3, wherein said flexible interface cable is a flat cable, and a wider surface of said flat cable is set along a vertical direction to a surface of said light transmitting member.

7. The image reading apparatus according to claim 3, further comprising drive unit adapted to drive said image reading unit, wherein said drive means is integrally provided with said image reading unit.

8. The image reading apparatus according to claim 3, wherein an operation switch which operates said image reading unit is integrally provided with said image reading unit.

9. The image reading apparatus according to claim 3, wherein said interface is a USB interface.

10. The image reading apparatus according to claim 3, wherein said interface is an IEEE1394 interface.

11. An image reading apparatus comprising:
    a light transmitting member on which an original is placed;
    an image reading unit, scanned along said light transmitting member, and adapted to read an image of the original via said light transmitting member;
    a control board, connected to said image reading unit, which controls reading of said image reading unit; and
    an interface which transmits an output signal from said control board to an external device,
    wherein said control board is moved together with said image reading unit.

12. The image reading apparatus according to claim 11, wherein said interface is a USB interface.

13. The image reading apparatus according to claim 11, wherein said interface is an IEEE1394 interface.

14. The image reading apparatus according to claim 11, wherein said interface is a wireless communication interface.

15. The image reading apparatus according to claim 14, wherein a power supply is a battery.

16. The image reading apparatus according to claim 15, wherein said power supply is integrally moved with said control board and said image reading unit.

* * * * *